United States Patent [19]

Rathnam

[11] Patent Number: 5,041,982
[45] Date of Patent: Aug. 20, 1991

[54] EDIT AREA ALGORITHM FOR NAVIGATION DISPLAY OF AN ELECTRONIC FLIGHT INSTRUMENT SYSTEM

[75] Inventor: Vijayakumar Rathnam, Glendale, Ariz.

[73] Assignee: Honeywell Inc., Minneapolis, Minn.

[21] Appl. No.: 594,672

[22] Filed: Oct. 9, 1990

Related U.S. Application Data

[63] Continuation of Ser. No. 283,317, Dec. 12, 1988, abandoned.

[51] Int. Cl.$^5$ .............................................. G08G 1/12
[52] U.S. Cl. .................... 364/443; 364/460; 364/449; 340/995
[58] Field of Search ............... 364/443, 444, 447, 449, 364/424.06, 460, 461; 340/946, 947, 948, 949, 721, 979, 970, 788, 995; 73/178 R, 178 T, 178 H

[56] References Cited

U.S. PATENT DOCUMENTS

| | | | |
|---|---|---|---|
| 4,360,876 | 11/1982 | Girault et al. | 364/449 |
| 4,489,389 | 12/1984 | Beckwith et al. | 364/518 |
| 4,608,656 | 8/1986 | Tanaka et al. | 364/443 |
| 4,675,676 | 6/1987 | Takanabe et al. | 340/995 |
| 4,760,531 | 7/1988 | Yasui et al. | 364/443 |
| 4,825,381 | 4/1989 | Bottorf et al. | 364/443 |
| 4,845,631 | 7/1989 | Bottorf | 364/443 |
| 4,896,154 | 1/1990 | Factor et al. | 364/443 |
| 4,994,974 | 2/1991 | Cummings | 364/443 |

Primary Examiner—Parshotam S. Lall
Assistant Examiner—Michael Zanelli
Attorney, Agent, or Firm—Dale E. Jepsen; D. Lenkszus; A. Medved

[57] ABSTRACT

In the navigation display of the electronic flight instrument system, the arc mode and Rose Nav mode of a navigation display require computation of parameters for a greater surface (modified Edit) area than the Edit area for each display scale. When the icons representing selected navigational features are included on the navigation display, the retrieved and stored icons can be positioned external to the viewable Edit area. Because access to a dictionary defining the position of the icons is sequential and because the display buffer storage unit from which the screen display is created has a limited capacity, the arc or Rose Nav display can include features in the non-viewable modified Edit area while not including important features in the Edit area. An algorithm is described that determines when a feature with which an icon is associated is in the Edit area and selects the data associated with those features in the Edit area to be stored in the display buffer storage unit. Data associated with features only in the modified Edit area are not stored in the display buffer storage unit. In the arc display mode and the Rose Nav display mode, the display screen can be continuously updated requiring the algorithm to operate with a dynamically changing display.

17 Claims, 5 Drawing Sheets

EDIT AREA ALGORITHM FOR NAVIGATION DISPLAY OF AN ELECTRONIC FLIGHT INSTRUMENT SYSTEM

This is a continuation of copending application Ser. No. 07/283,317 filed on Dec. 12, 1988 now abandoned.

BACKGROUND OF THE INVENTION

1. Field of the Invention

This invention relates generally to the navigation displays provided by an electronic flight instrument system and, more particularly, to the arc mode and the Rose Nav mode of the navigation display.

2. Description of the Related Art

In the present navigation display of the electronic flight instrumentation system, the operator has the option of choosing from a plurality of display screens. Referring to FIG. 1A, an arc mode (also referred to as the map mode) navigation display screen is illustrated. In this display mode, the flight of the aircraft is always oriented perpendicular to the top of the display screen. The arc mode navigation display screen includes an Edit area 10. The Edit area 10 of the arc mode navigation display screen exceeds the boundaries of the display device screen, the boundaries of the display screen coinciding with the viewable boundary 16. The Edit area is the area of the display that is the analog of the ground area for which information is required. The Edit area is determined by a controllable range setting and can, for example, be 10 nautical miles (nm), 20 nm, 40 nm, 80 nm, 160 nm and 320 nm. However, in the prior art arc (and Rose Nav) display mode, the feature determination was performed for the modified Edit area enclosed within boundary 19. Boundary 19 has a rectangular configuration passing through the corner points of the Edit area and oriented with respect to the North direction. The location of the aircraft is indicated on the display area by aircraft icon 11. The aircraft icon 11 is located at the map reference point (MRP), a fixed point on the display For the arc mode display screen, the map reference point and the aircraft icon are coincident The dashed vertical arrow 3 from the aircraft icon 11 to the top of the Edit area is coincident with the current heading of the aircraft. The direction of the current heading is known to the display apparatus from sensor and/or navigational apparatus (such as a gyroscope). The dashed vertical arrow 4 from the aircraft icon 11 to the bottom of the Edit area is in the opposite direction from the current heading arrow 3. The horizontal dashed arrows 2 to the sides of the Edit area 10 are perpendicular to the current heading. The length of the current heading arrow 3 is typically longer than dashed arrow 4 permitting features to be displayed over a greater area in front of the aircraft. The arc mode display screen also displays the planned flight path 15. The aircraft flight plan is typically specified in a multiplicity of geographical locations (i.e., latitude and longitude coordinates). These locations are entered in a multipurpose control and display unit and are displayed as icons on the navigation display screen. In FIG. 1A, the geographical location icons 12 are triangles.

Referring next to FIG. 1B, the same display screen is illustrated when the Rose Nav display mode is selected. Once again, the direction of the flight of the aircraft is always perpendicular to the top of the display screen. The display screen in this mode is the same as the display screen for the arc display in FIG. 1A with the exception that the map reference point and the aircraft icon are located in the center of the display screen, i.e., the vertical dashed arrow 3 is the same length as the reverse vertical arrow 4. In this display mode, equal emphasis is given to the features in the direction of travel of the aircraft and in the direction opposite to the direction of travel of the aircraft. In both the arc display mode and the Rose Nav display mode, the constant direction of the aircraft and the flight path direction result in a rotation of the displayed features as the aircraft flight direction changes.

Referring to FIG. 1C, the display screen shown in FIG. 1A and FIG. 1B is illustrated for the plan display mode. In this display mode, the Edit area 10 remains the same and the viewing area of the display screen is within the viewing boundary 19. However, in this display mode, the north direction is fixed in the vertical direction. Therefore, the flight path, equivalent to the flight path in FIG. 1A and FIG. 1B, is rotated. In the plan display mode, the map reference point, the center of the display, can be any selected flight path location. The airplane icon moves on the screen while the map reference point remains fixed until a further selection is made. Because the display is held constant with respect to the North direction, the Edit area is coincident with the modified Edit area.

Referring to FIG. 2, another feature of the navigation display is illustrated. In these navigation displays, data is available in the data base to provide a position of selected features that can be important in the flight of the aircraft on the display screen. For example, the locations of airports, of geographical features, of navigational aids (such as beacons) are stored in the data base and can be displayed, in response to activation by the operator, as an overlay on the display screens. In FIG. 2, icons 21 (circles), icons 23 (squares) and icons 24 (hexagons) are displayed. These icons can represent, for example, airports, geographical waypoints and nondirectional navigational beacons respectively. The icons can have alpha numeric information associated therewith identifying the icons. As the area displayed by the screen becomes larger (in response to control selection by the operator), it will be clear that an increasing number of icons will be displayed. As will be clear by comparison of the arc mode, the Rose Nav mode and the plan mode shown in FIG. 1A, FIG. 1B and FIG. 1C, respectively, the arc mode and the Rose Nav mode can have features present in the modified Edit area that can not be viewed under the current conditions. Because the Edit area and the modified Edit area are coincident in the plan mode of operations, no features will be present that are not in the Edit area.

The situation with respect to the display of icons is complicated by the storage capability of buffer storage units associated with the display apparatus controlling the display screen image. The display buffer storage unit contains the information related to features important to navigation permitting the display apparatus to provide the icons representing the important features on the display screen. The features information is, in turn, retrieved from a navigation data base unit containing all of the features information and stored in the display buffer storage unit according to a preselected algorithm The buffer memory storage unit is currently limited to 512 words, each word being 32 bits in length. Therefore, the number of icons for display on the display screen can exceed the available area in the display buffer storage unit in appropriate circumstances. More importantly, in the arc display mode and the Rose Nav display mode, feature information within the modified Edit area 19, but outside of Edit area 10 and therefore feature information that is unviewable, can be stored in the display buffer storage unit, while the more important information inside the Edit area 10 may not be displayed because of the limited capacity of the display buffer storage unit, thereby compromising the usefulness of the navigation display in the decision process.

A need has therefore been felt for a technique for maximizing the feature information that can be displayed on a navigation display screen in the Edit area while minimizing or eliminating feature information outside the Edit area in the modified Edit area.

FEATURES OF THE INVENTION

It is an object of the present invention to provide an improved electronic flight instrument system.

It is a feature of the present invention to provide an improved navigation display for an electronic flight instrument system.

It is still a further feature of the present invention to provide an improved arc display mode and an improved Rose Nav display mode in a navigation display.

It is yet a further feature of the present invention to determine when coordinates representing a point fall within the region represented by the Edit area of a navigation display that is changing dynamically because of changes in aircraft heading and aircraft position.

It is yet another feature of the present invention to determine when point coordinates fall within a preselected area by determining when the point coordinates satisfy a group of inequalities.

It is a more particular object of the present invention to determine when coordinates of a point fall within a preselected area represented by a polygon by determining the equations of lines bounding the polygon and using the line equations to determine inequalities of the form $0<f(x,y)$ and $0>f(x,y)$, that must be satisfied for the point coordinates (x,y) to fall within the polygon.

SUMMARY OF THE INVENTION

The aforementioned and other features are attained according to the present invention, by providing an algorithm to determine when a location of a feature is within the region represented by the Edit area of a display under dynamically changing conditions of the aircraft. Using the coordinates of the aircraft and the current heading of the aircraft, the coordinates of the corner points of the region represented by the Edit area are determined. Equations of lines passing through the corner point coordinates and defining the Edit area are determined. The line equations can be used to determine inequalities that point coordinates must satisfy in order to be located in the region represented by the Edit area. When the point coordinates associated with the feature fall within the Edit area, then the data group associated with the feature is transferred to the display apparatus. The arc display mode and the Rose Nav display mode provide dynamically varying display modes with which the algorithm operates.

These and other features of the invention will be understood upon reading of the following description along with the drawings.

DESCRIPTION OF THE PREFERRED EMBODIMENT

1. Detailed Description of the Figures

FIG. 1A, FIG. 1B, FIG. 1C and FIG. 2 have been described in relation to the related art.

Figure 1:
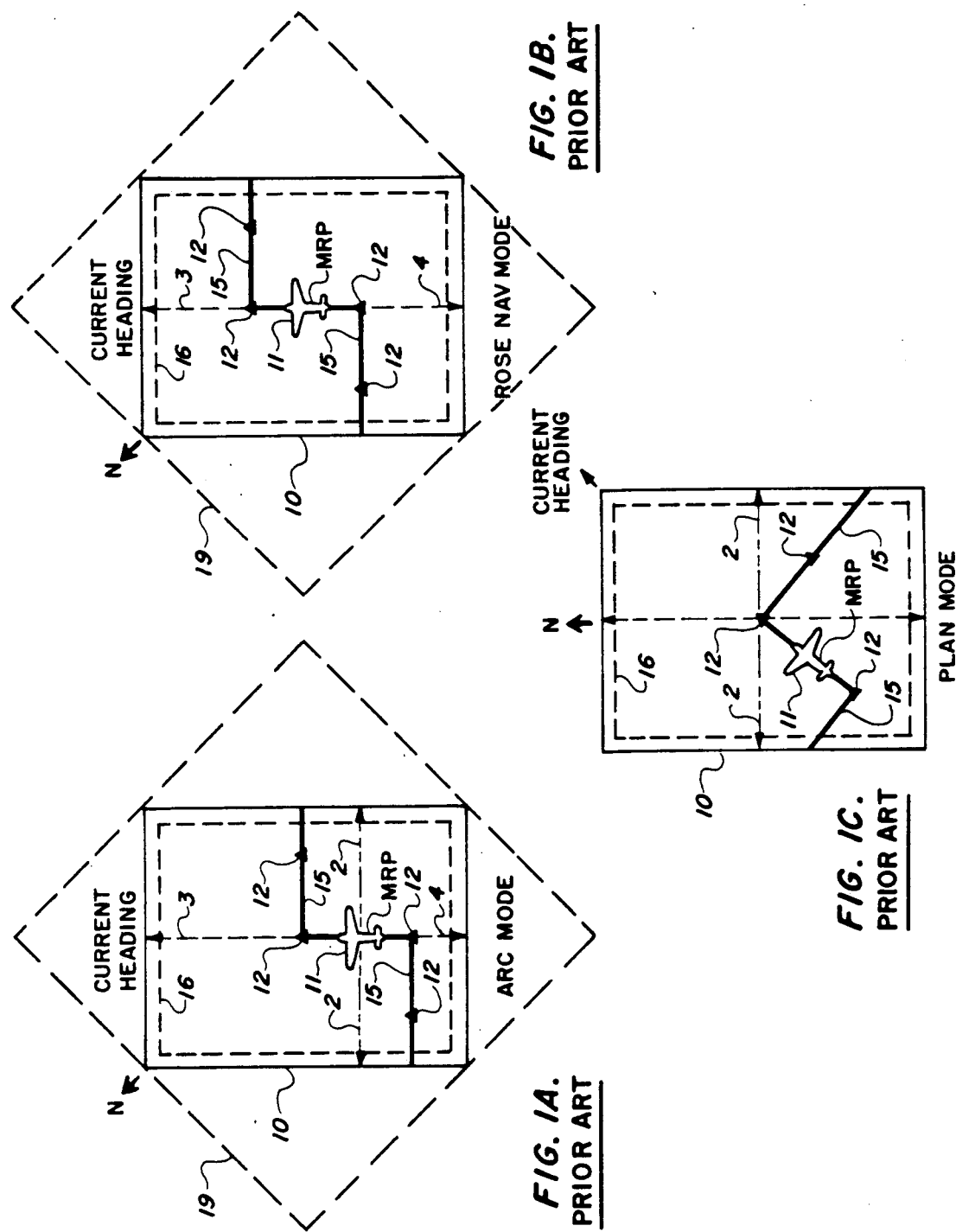
FIG. 1A illustrates a navigation display screen for the arc display mode.
FIG. 1B illustrates the same navigation display screen for the Rose-Nav display mode.
FIG. 1C illustrates the same display screen for the plan display mode.
Figure 2:
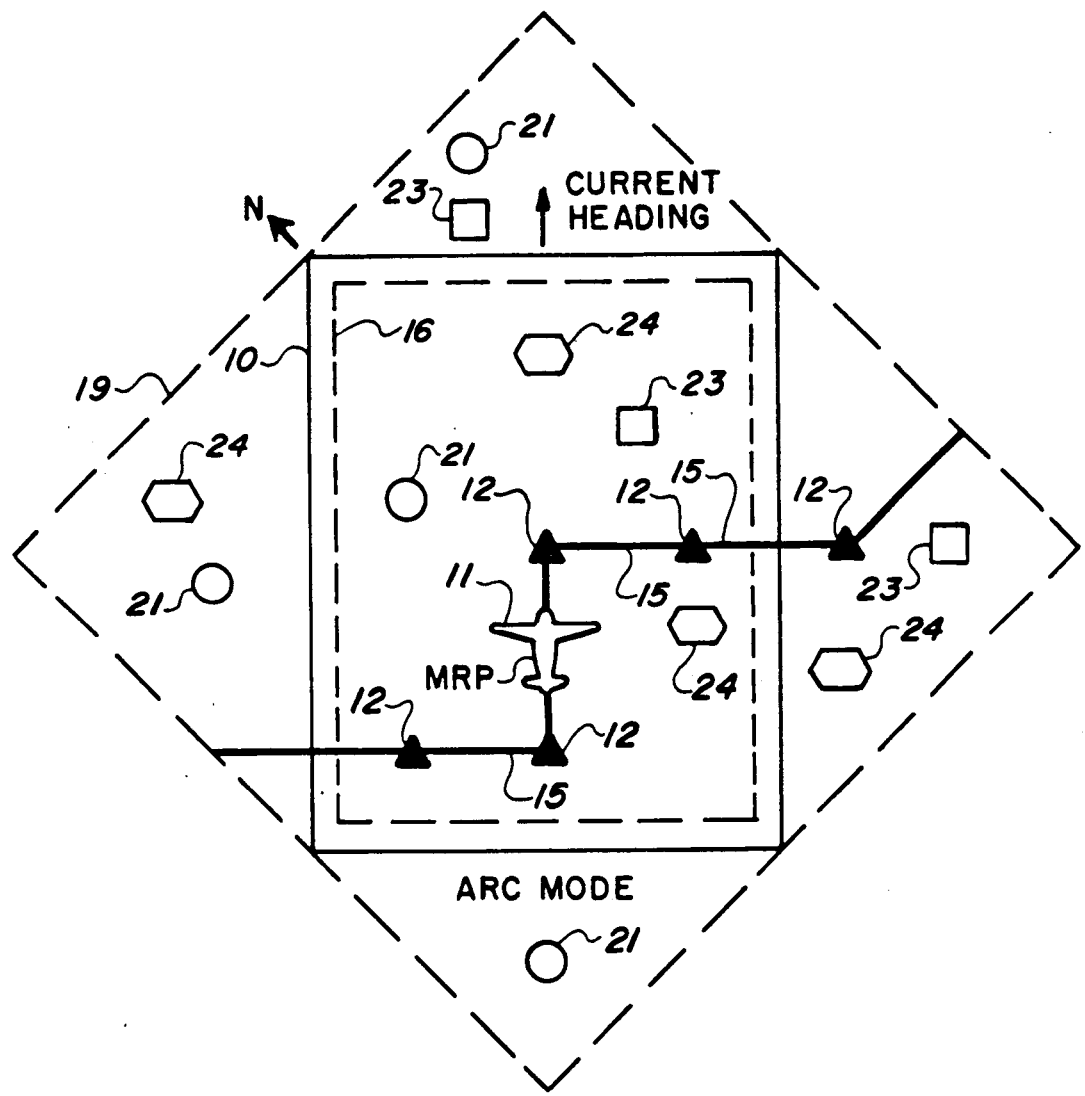
FIG. 2 illustrates the display screen of FIG. 1A when the display of selected features has been activated.
Figure 3:
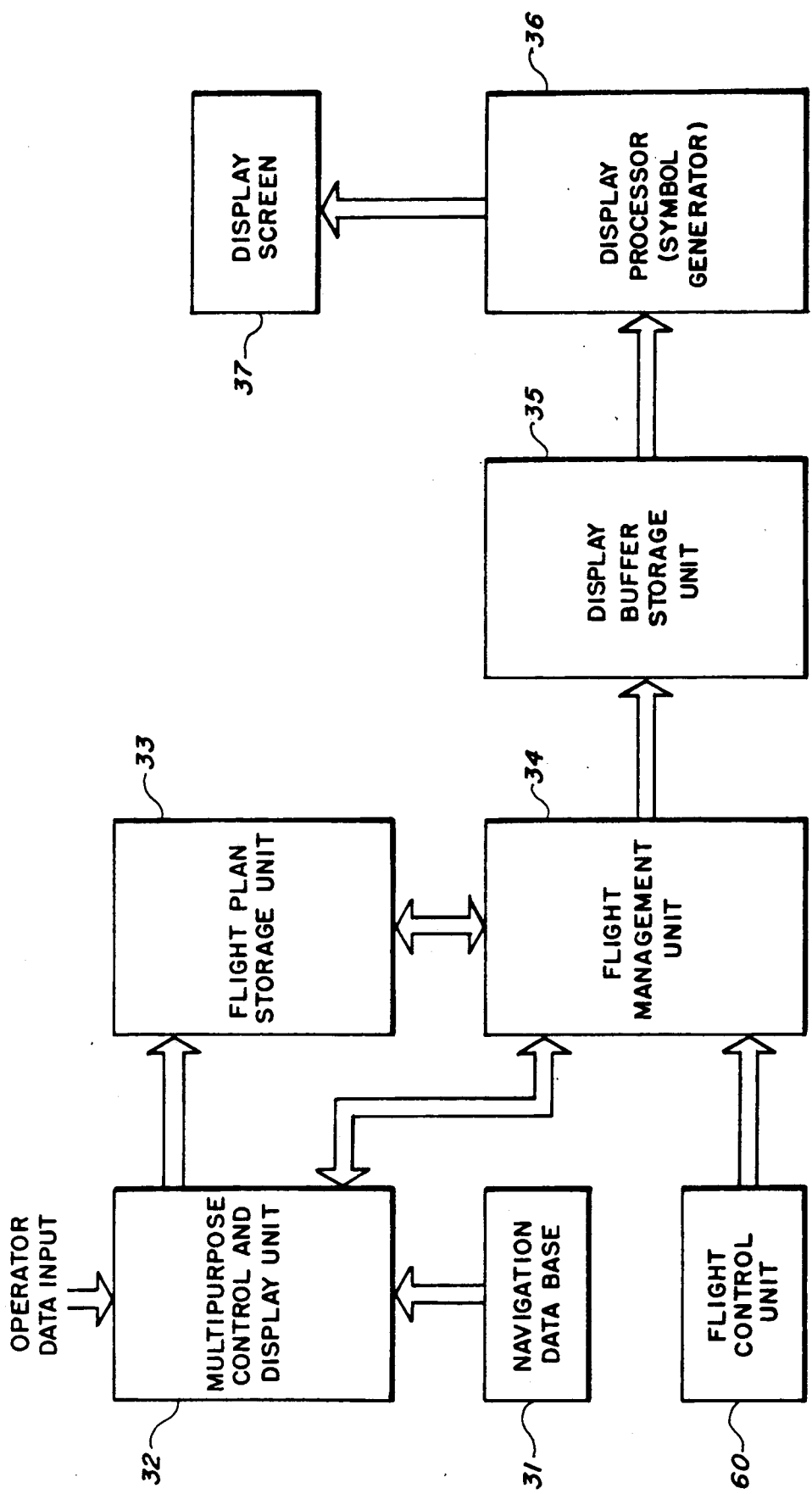
FIG. 3 is a block diagram of a flight management system capable of using the present invention.

Referring to FIG. 3, the components of a flight management system, capable of using the present invention advantageously, is illustrated. The multipurpose control and display unit 32 receives operator data input, such as the coordinates of the way points for the flight path. The multipurpose control and display unit 32 receives data from the navigation data base 31 which includes information with respect to the features that will be available to the aircraft operator. The multipurpose control and display unit 32 applies information with respect to the aircraft flight path and the features related thereto to the flight plan storage unit 33. The flight management unit 34, in response to signals from the flight control unit 60 (including range selection, mode selection and the selection of features to be displayed) and the flight plan storage unit 33, determines the appearance of the image to be displayed and enters the appropriate parameter information in the display buffer storage unit 35. The display processor 36 controls the image viewed on the display screen 37. The display processor includes apparatus, such as a symbol generator, for converting the parameter information from the display buffer storage unit 35 into appropriate images such as icons. In the preferred embodiment, multipurpose control and display unit 32 and flight management unit 34 are implemented by general purpose data processing units. Navigation data base 31 is implemented by a mass memory unit. The flight plan storage unit 33 and the display buffer storage unit 35 are data processing memory units. The display processor 36 is a specialized processor for activating the display screen 37, the display screen 37 being a high resolution cathode ray tube in the present invention.

Figure 4:
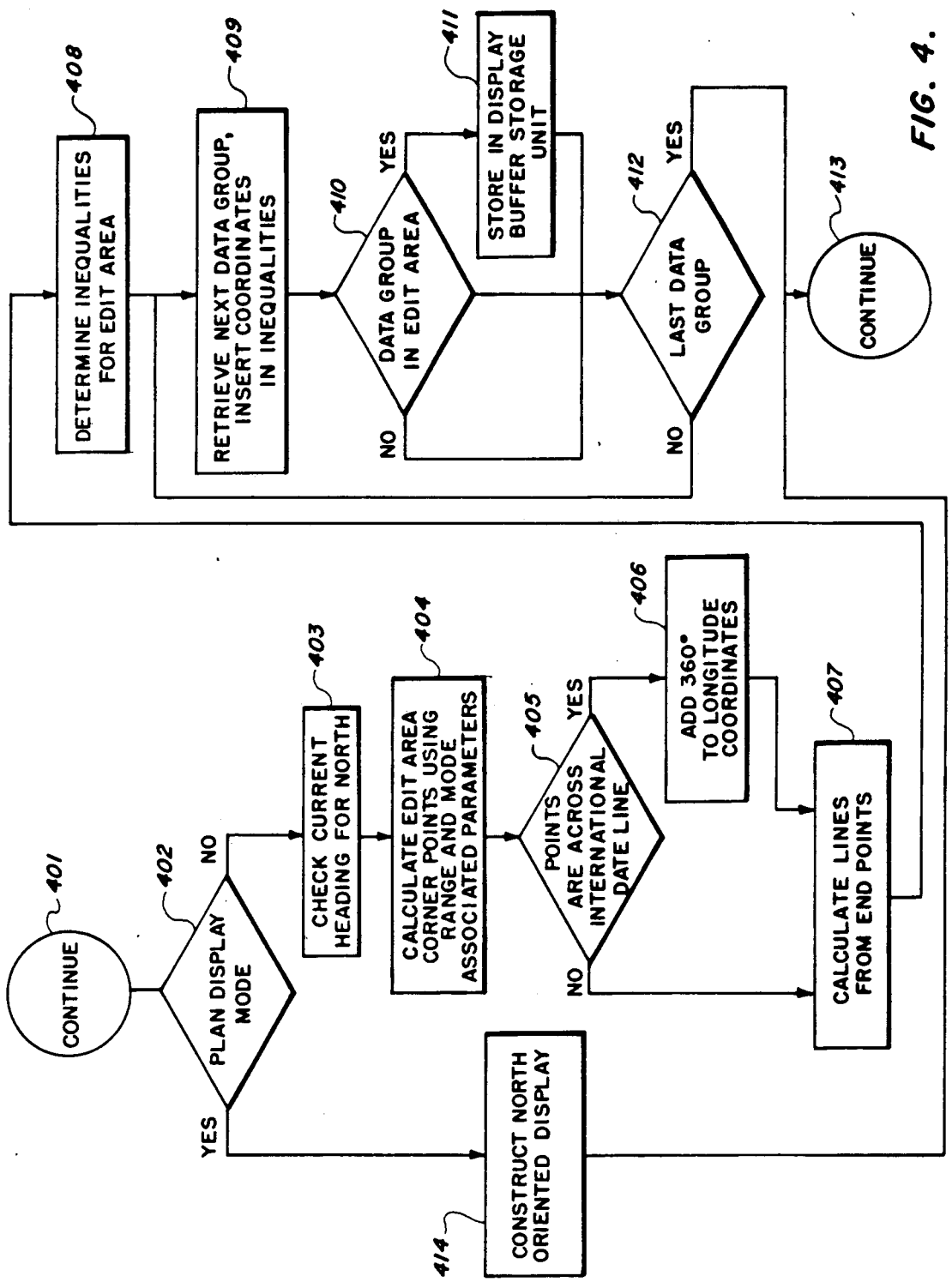
FIG. 4 is a flow diagram of the procedure for selecting the icons to be displayed on the navigational display.

Referring to FIG. 4, the flow diagram illustrating the procedure for performing the present invention is shown. The procedure is executed under conditions defined by signals from the flight control unit 60. In step 402, a determination is made whether the currently active display mode is the plan mode. For the plan display mode, the Edit area is coincident with the display screen (except for the small area outside of viewing boundary 16). All features in the geographical area represented by the display screen will be displayed and the selection procedure of the present invention is not required. When the determination is made that the plan display mode is not active in step 402, the current heading is checked to determine whether the current heading is north in step 403. When the current heading is north, the Edit area is coincident with the entire display screen and a simplified features display procedure can be used. When the current heading is not north, the corner points of the Edit area are determined in step 404. Though shown as a separate step 405, a determination is made whether any of the corner points cross the international date line relative to the aircraft position during determination of the corner points. When the international date line is crossed by points relative to the aircraft position, the longitude of coordinates to the east of the date line are incremented by 360° to provide compatible longitudinal differences. In step 407, the lines through the corner points of the Edit area are determined by using the points themselves. Using the lines enclosing the Edit area, four inequalities are determined in step 408. In step 409, a data group relating to a feature that potentially is to be displayed is retrieved. The coordinates included in this data group are inserted into the inequality equations to determine if the feature is located in the region simulated by the Edit area in step 410. When the coordinates are in the Edit area, then the data group is stored in the display buffer storage unit in step 411. In step 412, a determination is made if the retrieved data group was the last data group. When the retrieved data group is not the last data group, the next data group is retrieved in step 409. When the last data group is retrieved as determined in step 412, then the display processing continues in step 413. When the plan display mode is present in step 402, then a north oriented display is constructed in step 414. After step 414, the procedure continues in step 413.

When the Edit area is oriented toward the north, the Edit boundaries are described by a longitude coordinate on the east, a longitude coordinate on the west, a latitude coordinate on the north and a latitude coordinate on the south.

Figure 5:
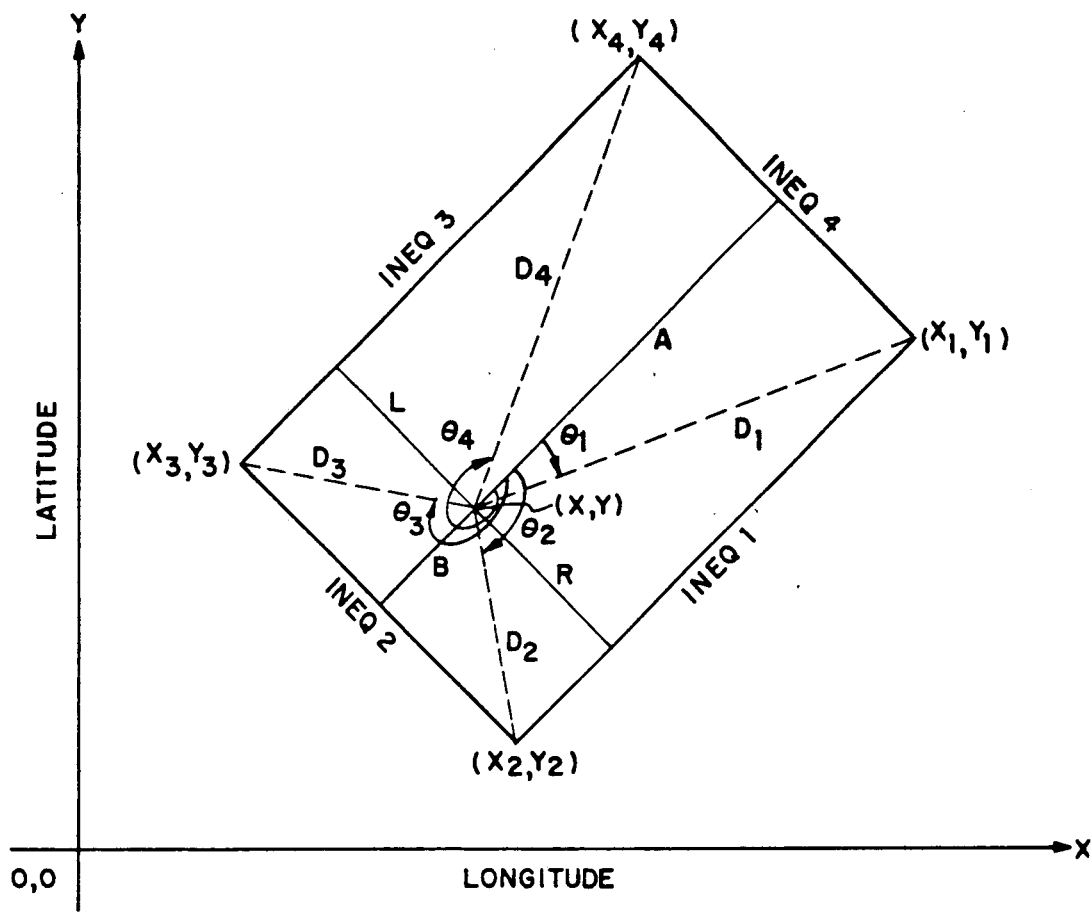
FIG. 5 is a diagram of the Edit area illustrating the parameters related to the present invention.

Referring next to FIG. 5, the computation of the inequalities defining the Edit area are determined as follows. Based on the mode and range determination, the following precomputed parameters related to the Edit area relative to aircraft position are retrieved (i.e., from main memory): the diagonal distances ($D_1$, $D_2$, $D_3$ and $D_4$, distance ahead (A), the distance behind (B), the distance to the left and right (L and R), and the bearings from the current heading to each corner point ($\Theta_1$, $\Theta_2$, $\Theta_3$ and $\Theta_4$). The current heading ($\alpha$) is retrieved from flight status data. Knowing the coordinates of the aircraft (x, y), the coordinates of the four corner points $\{(x_1, y_1), (x_2, y_2), (x_3, y_3)$ and $(x_4, y)\}$ can be determined from the distance and the angle relative to the aircraft position according to known principals of analytic geometry. (This calculation includes the corrections for the curvature of the earth in the preferred embodiment). Next, using the principals of analytic geometry, lines connecting the adjacent corner points can be determined. Four equations are obtained therefrom.

1.) $0 = f_1(x, y)$ for the line through $(x_1, y_1)$ and $(x_2, y_2)$
2.) $0 = f_2(x, y)$ for the line through $(x_2, y_2)$ and $(x_3, y_3)$
3.) $0 = f_3(x, y)$ for the line through $(x_3, y_3)$ and $(x_4, y_4)$
4.) $0 = f_4(x, y)$ for the line through $(x_4, y_4)$ and $(x_1, y_1)$ From these equations, it will be clear that a point in the Edit area must satisfy all the following inequalities.

5.) $0 \leq f_1(x, y)$
6.) $0 \leq f_2(x, y)$
7.) $0 \geq f_3(x, y)$
8.) $0 \geq f_4(x, y)$ The polarity of the inequalities is determined using the aircraft position latitude and longitude as test points.

Therefore, when the inequalities 5 through 8 are satisfied, the feature is in the Edit area and the data group related thereto should be entered in the display buffer storage unit.

The north oriented Edit area uses four inequalities to determine when points (coordinates) are located in the Edit area. However, in this situation, each line is represented by a single parameter.

Figure 6:
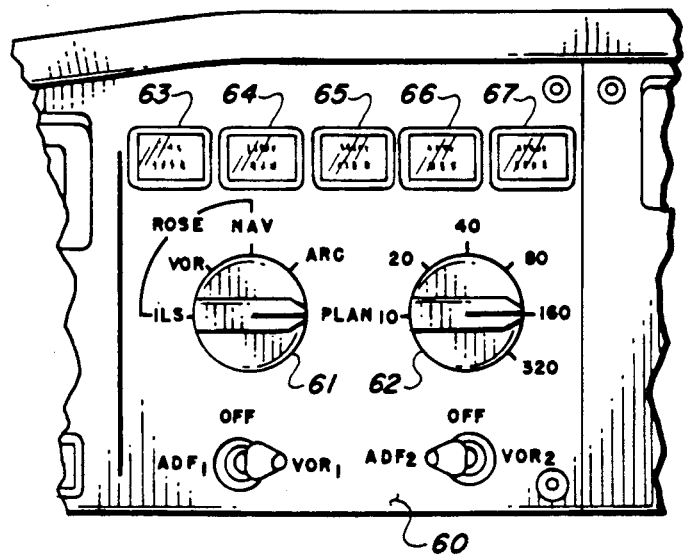
FIG. 6 illustrates the appearance and display controls for a typical flight control unit.

Referring next to FIG. 6, a flight control unit 60 according to the preferred embodiment is illustrated. The selection switch 61 permits the operator to select from the plan mode, the arc mode and the Ros Nav mode. Two additional switch positions are illustrated, but have not been implemented in the preferred embodiment. Switch 62 permits the operator to select the range. As indicated above, ranges of 10 nm, 20 nm, 40 nm, 80 nm, 160 nm and 320 nm are available. The buttons 63, 64, 65, 66 and 67 control the features that are displayed on the display screen. For example, activation of button 63 can result in the display of the location of airports, button 64 can result in the display of the location of non-directional beacons, button 65 can result in the display of locations of navigation aids, button 66 in the display of ground way points and activation of button 67 can result in the display of the location of constraint, e.g., prohibited airspace. The switches at the bottom of the flight control unit are not relevant to the understanding of the present invention.

2. Operation of the Preferred Embodiment

When an Edit area is not oriented in a north direction, the central processing unit identifies that condition and institutes the procedure for defining the Edit area by four inequalities. In order for a feature to be displayed in the Edit area, the coordinates of the feature must satisfy the four inequalities. The four inequalities are derived from the equations of the lines bounding the Edit area. The equations of the lines bounding the Edit area are determined by the coordinates of the by the range entered by the operator.

In order to expedite the computation, the diagonal distances, the distances to the Edit area boundary and the angles of the diagonal distances relative to the current heading are pre-computed in the preferred embodiment. These precomputed parameters permit the computation of the corner points of the Edit area and, consequently, the lines bounding the Edit area. In the preferred embodiment, the correction resulting from the curvature of the earth is included in the calculation of the corner points of the Edit area.

Because the features that are located within the Edit area (as distinguished from the modified Edit area) are the only features selected, i.e., for display on the navigation display, the display buffer storage unit 35 will not store the extraneous features displayed in the prior art when the display screen is operating in the plan mode. It will be clear that the data groups in the display buffer storage unit 35 will have to be updated as the position and the current heading of the aircraft changes. The data group location data is used by the display apparatus to locate the displayed icon on the navigation display screen in the correct location relative to the aircraft icon.

The invention has been described in terms of a electronic flight instrument system display, however, it will be clear that the technique of determining when coordinates fall within a preselected area represented by a polygon by using a group of inequalities derived from the line equations representing the boundaries of the polygon has more general applicability.

The arc display mode and the Rose Nav display mode provide displays that are dynamically changing as the position and direction of the aircraft change. The present invention, with the reduced requirements on the display buffer storage unit, can expedite the updating of the display.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. In an electronic flight management system, a method for determining when a physical feature having a coordinate set falls within a preselected geographical area, wherein said preselected geographical area is defined by a range of parameter and a direction parameter associated with a first coordinate set, said direction parameter indicating a direction other than north, said electronic flight management system displaying icons on a dynamically varying display screen, wherein said icons are indicative of a physical feature, said method comprising the steps of:

by means of a processor of said flight management system, determining corner coordinates of said preselected geographical area from said range parameter, said direction parameter, and said first coordinate set;

by means of said processor, calculating inequalities determined by lines passing through said corner coordinates;

inserting a coordinate set of a physical feature in said inequalities, said coordinate set identifying a physical feature to be displayed on a display screen when said coordinate set satisfies said inequalities and is in said preselected geographical area;

storing each coordinate set of a physical feature determined to be in said preselected geographical area in a buffer storage unit of said flight navigation system; and by means of a display processor unit of said flight management system, displaying an icon indicative of each physical feature having a coordinative set stored in said buffer storage unit, said icon being displayed on said display screen in a same relative position as said physical feature is located in said preselected geographical area.

2. The method of claim 1 further comprising the step of precomputing position parameters determined by said range parameter and said direction parameter, said position parameters expediting computation of said corner coordinates.

3. The method of claim 1 further comprising the step of using a different icon to indicate each type of physical feature, wherein said coordinate set includes information identifying a type of physical feature at a location determined by said coordinate set.

4. The method of claim 1 wherein said coordinate set and said first coordinate set are specified by longitude and latitude values, said method further comprising the step of correcting for global curvature in said calculating corner coordinates.

5. An electronic flight instrument system for an aircraft, said electronic flight instrument system including a dynamically changing display screen, said system comprising:

storage means for storing parameters identifying a coordinate location of and identification of a plurality of features to be displayed by said electronic flight instrument system;

processing means responsive to input signals identifying a location of said aircraft, a current heading of said aircraft and a range parameter for determining a preselected geographical area to be displayed as an edit area of said aircraft, said edit area occupying substantially an entire area of said display screen, a vertical direction of said edit area coinciding with said aircraft current heading, said processing means responsive to said location of said aircraft and said range parameter along with said current heading for determining coordinates represented by corners of said display screen, said processing means including edit means for using said corner coordinates to generate a plurality of inequalities defining said geographical area represented by said edit area, said edit means using said inequalities and coordinate location parameters of said features for determining when a first feature is located in said preselected geographical area represented by said edit area;

buffer storage means for storing coordinate location parameters and parameters identifying each first feature when said coordinate location parameters of said each first feature are in said preselected geographical area; and display means for displaying icons on said display screen representing said each first feature stored in said buffer storage means at a location in said edit area related to a location in said preselected geographical area.

6. The electronic flight instrument system of claim 5 wherein said processor means includes means for determining when a current heading of said aircraft is north, wherein said each first feature in said preselected geographical area can be determined without said inequalities when said current heading is north.

7. The electronic flight instrument system of claim 5 wherein said inequalities are determined by lines through adjacent corner coordinates.

8. The electronic flight apparatus of claim 5 further comprising means for selecting said range parameter, display modes, and features to be displayed on said display screen.

9. The electronic flight apparatus of claim 8 further comprising means for entering a flight path in said electronic flight system, wherein said flight path is displayed on said edit area by said display means.

10. The electronic flight apparatus of claim 8 wherein a display mode is selected from a one of an arc display mode and a Rose Nav display mode.

11. The electronic flight apparatus of claim 5 wherein icons displayed on said display screen can be selected to represent a one of a group consisting of airport locations, non-directional beacon locations, navigational aids and ground way points.

12. A method of displaying icons indicative of physical features located in a preselected geographical area by a navigation system, said preselected geographical area represented by an edit area, said edit area displayed by a dynamically changing display screen, wherein said physical features have location coordinates in said preselected geographical area, said method comprising the steps of:

storing in a memory unit of said navigation system location coordinates of said physical features;
  entering in said navigation system a range parameter, an aircraft current heading parameter, and an aircraft location parameter;
  determining by a processor unit of said navigation system said preselected geographical area from said range parameter and said aircraft current heating parameter, said preselected geographical area determined in relationship to said aircraft location parameter;
  calculating by said processor unit corner coordinates for said preselected geographical area;
  determining by said processor unit a set of inequalities from lines through said corner coordinates, said set of inequalities defining location coordinates located in said preselected geographical area;
  inserting said physical feature location coordinates in said set of inequalities to determine when said physical feature having said location coordinates is in said preselected geographical area;
  storing said physical feature location coordinates in a buffer memory unit when said location coordinates are in said preselected geographical area; and
  using a navigation system display processor, displaying icons on said display screen edit area when said physical feature of which said icon is indicative has location coordinates stored in said buffer memory unit.

13. The method of displaying icons of claim 12 wherein said displaying step includes the step of displaying said icons by means of said display processor on said display screen at a location analogous to a location of said physical feature in said preselected area.

14. The method of displaying icons of claim 12 further comprising the step of inhibiting a determination of said inequalities when said aircraft current heading is in the north direction.

15. The method of displaying icons of claim 14 further comprising the step of selecting one display mode from the group consisting of an arc display mode and a Rose Nav display mode.

16. The method of displaying icons of claim 15 further comprising the step of selecting icons representing physical features selected from a group consisting of airports, navigational aids, non-directional beacons and ground way points.

17. The method of displaying icons of claim 16 further comprising the step of entering coordinates of flight plan points in said navigation system, said flight plan points being displayed on said display screen by selected icons.

* * * * *